(12) United States Patent
Weigl

(10) Patent No.: US 8,757,355 B2
(45) Date of Patent: Jun. 24, 2014

(54) METHOD AND DEVICE FOR LOADING A CONTAINER WITH PRODUCTS COMPRISING THIN SHEETS OF GLASS OF A LARGE SURFACE AREA

(75) Inventor: Helmut Weigl, Straubing (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 565 days.

(21) Appl. No.: 13/121,760

(22) PCT Filed: Sep. 24, 2009

(86) PCT No.: PCT/DE2009/001353
§ 371 (c)(1),
(2), (4) Date: Jun. 9, 2011

(87) PCT Pub. No.: WO2010/037366
PCT Pub. Date: Apr. 8, 2010

(65) Prior Publication Data
US 2011/0247914 A1    Oct. 13, 2011

(30) Foreign Application Priority Data

Oct. 2, 2008   (DE) .......................... 10 2008 050 221

(51) Int. Cl.
*B65G 49/06*   (2006.01)
*B65B 5/10*    (2006.01)
(52) U.S. Cl.
CPC *B65G 49/06* (2013.01); *B65B 5/103* (2013.01)
USPC ................................ 198/379; 53/542; 53/251
(58) Field of Classification Search
CPC .... B65G 49/06; B65G 49/062; B65G 49/067; B65G 49/068; B65G 2249/02
USPC .......................... 53/473, 542, 251; 198/379
See application file for complete search history.

(56) References Cited

U.S. PATENT DOCUMENTS

| | | | | |
|---|---|---|---|---|
| 5,209,627 A | * | 5/1993 | Lisec | 414/398 |
| 5,375,959 A | * | 12/1994 | Trento | 414/277 |
| 5,379,904 A | * | 1/1995 | Brown | 211/85.8 |
| 5,738,482 A | | 4/1998 | Piazza | |

(Continued)

FOREIGN PATENT DOCUMENTS

| DE | 44 28 897 A1 | 7/1997 |
|---|---|---|
| DE | 196 00 348 A1 | 7/1997 |

(Continued)

OTHER PUBLICATIONS

International Search Report Dated Feb. 9, 2010.

(Continued)

*Primary Examiner* — Hemant M Desai
(74) *Attorney, Agent, or Firm* — Brinks Gilson & Lione

(57) ABSTRACT

Method and device for loading a container with products which are made up of individual thin sheets of glass (1) of a large surface area or with individual sheets of glass (1), in particular photovoltaic modules, TFT screens or component parts thereof, comprising the following features: a) means for respectively bringing into place individual sheets of glass (1) or products made up of various sheets of glass (1), b) a vertical adjuster with a sliding carriage (16) and supporting forks (12), c) a transverse transporting device (18) for loading, d) a device for transferring force from the transverse transporting device (18) to a transporting belt (8) respectively of the container.

20 Claims, 9 Drawing Sheets

(56) References Cited

U.S. PATENT DOCUMENTS

| | | | |
|---|---|---|---|
| 5,860,539 A * | 1/1999 | Brown | 211/183 |
| 6,247,601 B1 * | 6/2001 | Norton et al. | 211/41.14 |
| 6,382,897 B2 | 5/2002 | Mattio et al. | |
| 6,648,572 B2 * | 11/2003 | Piazza | 414/276 |
| 7,137,164 B2 * | 11/2006 | Dickerson et al. | 15/77 |
| 7,182,559 B1 * | 2/2007 | Groth et al. | 410/32 |
| 7,217,077 B2 * | 5/2007 | Mercure | 414/398 |
| 7,323,979 B2 * | 1/2008 | Eskildsen | 340/521 |
| 7,531,044 B2 * | 5/2009 | Dickerson et al. | 134/15 |
| 7,656,279 B2 * | 2/2010 | Okada et al. | 340/426.27 |
| 7,686,550 B2 * | 3/2010 | Mix | 410/34 |
| 7,845,892 B2 | 12/2010 | Hügler | |
| 7,878,754 B2 * | 2/2011 | Mercure | 414/801 |
| 7,980,259 B2 * | 7/2011 | Dickerson et al. | 134/135 |
| 2005/0024207 A1 * | 2/2005 | Schebel et al. | 340/545.2 |
| 2007/0017841 A1 * | 1/2007 | Mix et al. | 206/454 |
| 2008/0079217 A1 | 4/2008 | Piazza | |
| 2010/0321172 A1 * | 12/2010 | Suzuki et al. | 340/425.5 |

FOREIGN PATENT DOCUMENTS

| | | |
|---|---|---|
| DE | 601 00 297 T2 | 4/2004 |
| DE | 10 2005 039 453 A1 | 3/2007 |
| DE | 102008024407 A1 | 11/2008 |
| EP | 0 506 198 A1 | 9/1992 |
| EP | 0 621 220 A2 | 10/1994 |
| EP | 694 05 904 T2 | 4/1998 |
| EP | 1 473 261 A1 | 11/2004 |

OTHER PUBLICATIONS

German Office Action Dated Sep. 1, 2009 and English Translation.
PCT Publication WO2010/037366 A1, Dated Apr. 8, 2010.

* cited by examiner

METHOD AND DEVICE FOR LOADING A CONTAINER WITH PRODUCTS COMPRISING THIN SHEETS OF GLASS OF A LARGE SURFACE AREA

CROSS REFERENCE TO RELATED APPLICATIONS

This application is a national stage application under 35 U.S.C. 371 of international application number PCT/DE2009/001353 filed Sep. 24, 2009 (WO 2010/037366) and also claims priority to German application number 10 2008 050 221.9 filed Oct. 2, 2008, all of which are hereby incorporated by reference in their entirety.

SUMMARY

The invention relates to the loading of a container with products comprising thin sheets of glass of a large surface area in clean-room conditions. By way of example, such a product may be a modern flat screen or sheets of glass as parts of flat screens, of a so-called TFT screen. Here, TFT stands for "Thin Film Transistor". The TFTs are very small transistor elements which control the orientation of liquid crystals, and therefore the light transmission thereof. For standard office applications, flat screens have outstanding sharpness and a sufficient color quality. In ergonomic terms, such so-called TFTs also have much to offer: smaller space requirement, a power consumption which is only a third of that of a tube monitor and significantly lower emission of radiation. As is conventional in microelectronics, the production of TFT screens requires so-called clean rooms, or ultraclean rooms when line structures are applied. This is necessary because, in view of the small size of the line-carrying structures, even small particles can cause line interruptions during the production process. In the case of production of a TFT screen, such a line interruption would result in the failure of a pixel. Therefore, the production of such screens requires ultraclean room conditions.

A clean room, or an ultraclean room, is a room in which the concentration of airborne particles is controlled. It is constructed and used in such a way that the number of particles introduced into the room or produced and deposited in the room is as small as possible, and other parameters, such as temperature, humidity or air pressure, are controlled as required.

On the one hand, the TFT screens are currently becoming less and less expensive, and on the other hand the demand for screens with enormous proportions is increasingly standing out, all the more so because screens of this type firstly can be used very easily at major events and secondly are available in affordable price ranges due to modern production technology. However, the production of large screens requires special machines even in clean rooms or ultraclean rooms to handle the thin glass plates of a large surface area required in this case.

On the other hand, such a product comprising glass plates of a large surface area may involve so-called photovoltaic modules or sheets of glass as parts of photovoltaic modules.

In many cases, modern glass façades are not just a functional element of a structure, but in fact also serve increasingly for generating solar energy. Tailored solar modules make accurate integration into building grids and profiles possible. Semitransparent solar cells, but also opaque solar cells with transparent areas, make photovoltaic glazings appear to be flooded with light. Here, the solar cells often take on the desired effect of protection against the sun and glare.

The production of such photovoltaic systems requires operating conditions such as those which are conventional primarily in the production of semiconductors and integrated electronic circuits. The production of photovoltaic systems is therefore still relatively expensive. The aim is therefore to produce photovoltaic elements on a large scale and to reduce the costs.

As viewed from the outside, a photovoltaic module involves the connection of a glass substrate plate, a photovoltaic element and a glass plate as covering glass by means of a film which bonds said glass plates under the action of heat.

DE 694 05 904 T2 discloses substantially a glass sheet loading and tilting machine for successively removing sheets of glass from a stack of sheets of glass, which are layered one above another and are arranged substantially in vertical planes in a stand. In this case, the sheets of glass are intended to be placed onto a substantially horizontal supporting structure (5) in order to be conveyed and tilted, wherein the machine has, as an essential component part, at least one frame (6), which is pivotable about a horizontal axis parallel to the sheets of glass in the stack and which has suction elements, which can be moved into contact with the surface of the sheets, wherein the frame is fastened to the supporting structure by at least one extendable bar. The protection essentially sought in the case of such a machine is that the latter has devices (11) for shifting the horizontal axis (a) of the pivotable frame (6) substantially upward and toward the interior of the supporting structure (5). The special treatment of thin sheets of glass of a large surface area in a clean room and the loading of a container are not dealt with in said document.

Furthermore, DE 601 00 297 T2 discloses a system for sorting and transferring sheets of glass, wherein the system comprises a number of trolleys, each of which has a number of compartments each for receiving at least one corresponding sheet of glass, and sorting means for supporting the sheets and for feeding the sheets to a corresponding compartment.

The protection sought in the case of such a system is that the sorting means have rotary supporting means which rotate about an axis of rotation, and that the trolleys are arranged in a ring around the rotary supporting means.

In this document, various glass plates are sorted; however, the loading of thin sheets of glass of a large surface area in a clean room is not dealt with.

The device according to the invention and the method according to the invention are therefore based on the object of loading and unloading a container for receiving a plurality of thin sheets of glass of a large surface area in clean-room conditions, of identifying defective sheets of glass and of removing these defective sheets of glass easily and reliably, the container itself requiring no separate power source.

This object is achieved by the device as claimed in claim 1 and by the method as claimed in claim 9.

Further aspects of this application will become readily apparent to persons skilled in the art after a review of the following description, with reference to the drawings and claims that are appended to and form a part of this specification.

BRIEF DESCRIPTION OF THE DRAWINGS

The device according to the invention is described in more detail below.

In detail.

DETAILED DESCRIPTION

Figure 1:
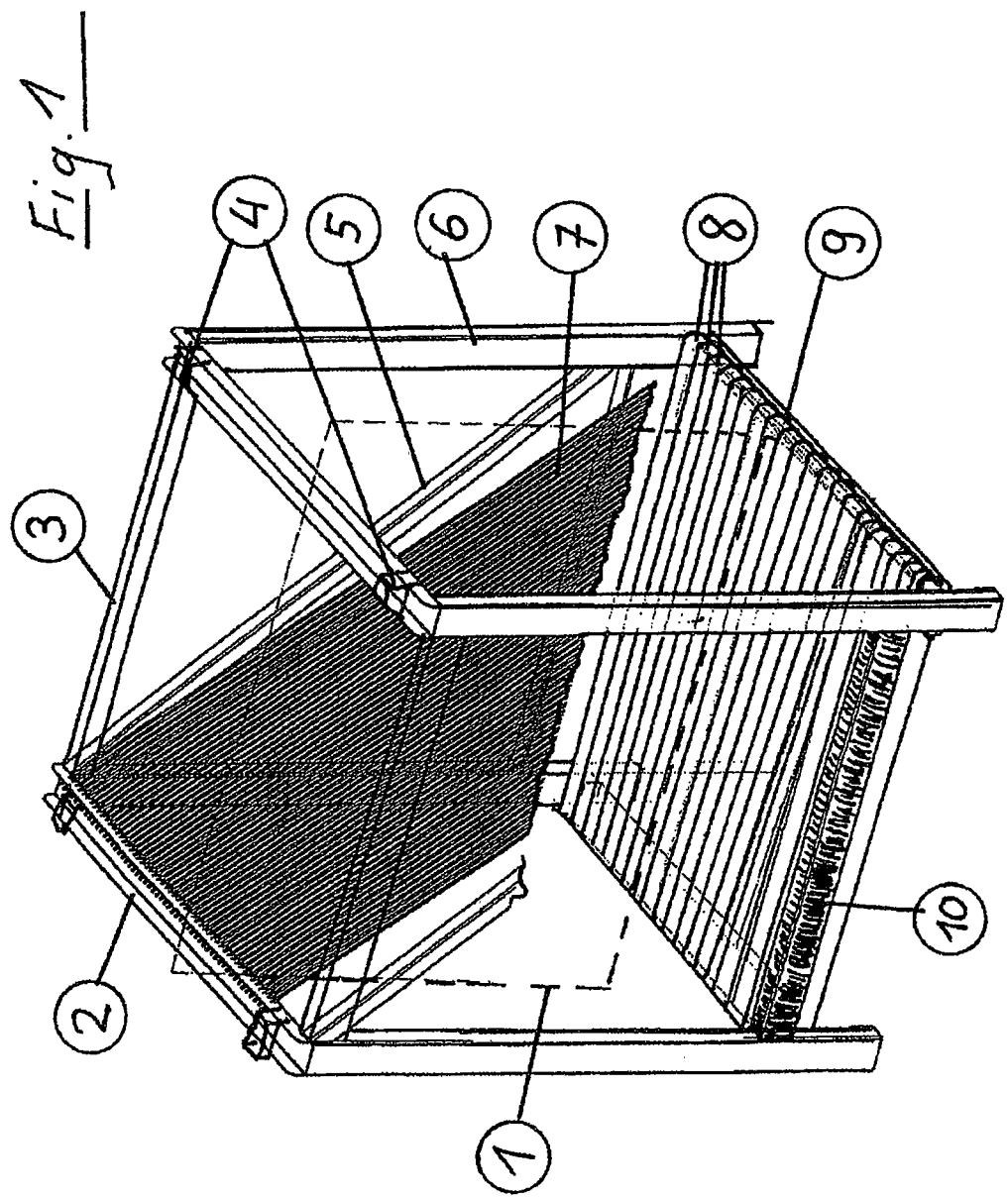
FIG. 1: is a perspective illustration of a container.

FIG. 1 is a perspective illustration of a container, which can be loaded with products comprising individual sheets of glass or with an assembly of individual sheets of glass during the production of, for example, TFT screens or photovoltaic modules. Such a container consists essentially of a rear portal (2) and a front portal (6), which are connected to one another by two upper longitudinal struts (3) and two lower longitudinal struts (10), and are connected via one or more stabilizers which extend obliquely to the portals. The front, lower longitudinal strut (10) is marked by fine dashes in FIG. 1, for reasons of clarification and in order to distinguish it from the nearest conveyor belt (8). A number of separating spokes (7) are shown in FIG. 1, extending substantially in the direction of the stabilizer (5) shown, although said separating spokes are not carried on as far as their end in order to make it easier to identify the conveyor belts (8). The conveyor belts (8) extend parallel to the lower longitudinal struts (10) and the interstices thereof are sectioned off via the separating spokes (7). In order to illustrate the position of the sheets of glass stored in the housing, a sheet of glass (1) is indicated in FIG. 1 with dashed outer edges. The conveyor belts (8) arranged in parallel are mounted on the support member (9) on the front side. More details relating to the mounting of the conveyor belts (8) can be gathered from FIG. 3.

The transport brackets (4) fitted on the housing serve for the transport of the entire housing. They are denoted merely on the front portal, but are likewise located on the rear portal, as can be gathered from FIG. 1.

Figure 2:
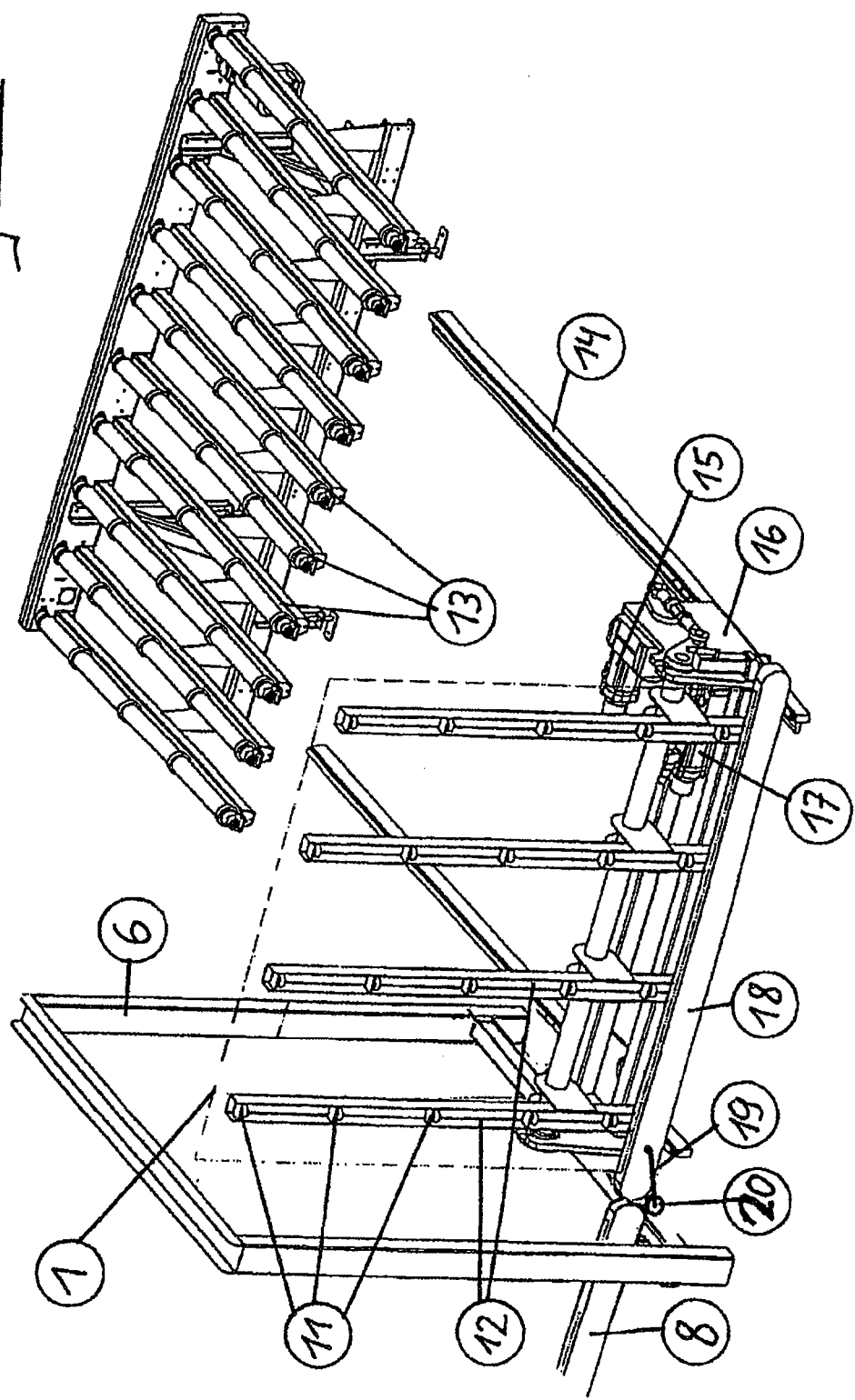
FIG. 2: is a perspective detailed illustration of the conveying devices.

FIG. 2 is a perspective detailed illustration of the conveying devices, which contribute to the conveyance of a sheet of glass (1) into the container shown in FIG. 1.

The upper, rear region shows the rollers (13) of a roller conveyor, on which the respective sheet of glass (1) is brought into place in a horizontal position. The slide rails (14) of the displacement carriage (16) of the vertical adjuster, which are fastened to the floor, extend parallel to the direction of the guide rollers (13) of the roller conveyor. Said vertical adjuster can likewise accept the sheets of glass (1) delivered in the horizontal position by the roller conveyor in the horizontal position and then pivot them into a vertical position.

Here, the drive (17) of the displacement carriage (16) ensures that the displacement carriage (16), with the supporting forks (12), can move in between the rollers (13) of the roller conveyor and can accept a sheet of glass (1) from the roller conveyor by moving back. This can take place by virtue of the supporting forks (12) lifting slightly in the region of the roller conveyor.

If the vertical adjuster has accepted a sheet of glass (1) on the horizontally pivoted supporting forks (12), said sheet of glass comes to rest on the fixing means (11). Said fixing means (11) consist of an abrasion-resistant material, which is suitable for clean rooms and prevents slipping of the sheet of glass (1). Sensors (25), which monitor the integrity of the overlying sheet of glass (1), are arranged in the region of the fixing means (11). For this purpose, it is possible, by way of example, to use sensors which detect unusual refraction, which is characteristic of glass breakage, at breakage points and report this to the input unit of the control program. In this case, the sheet of glass (1) in question can be returned via the roller conveyor, for example, or be supplied for disposal by means of suckers and a separate conveying device. The selection of the appropriate sensors (25) is governed by the type of sheet of glass (1) transported in each case or by the assembly of sheets of glass (1).

The displacement carriage (16) then conveys the respective sheet of glass (1) to the relevant location of the container intended therefor.

The drive (15) of the vertical adjuster then pivots the sheet of glass (1) into a virtually vertical, slightly inclined, position, and the sheet of glass thus stands on the transverse conveying device (18).

This device consists of an endless conveyor belt, which runs over two inner rollers at the start and at the end of the device (18). The drive of this belt is denoted by (17).

A rocker lever (19), which bears a force transmission wheel (20) at its free end, is fitted in the region of that side of the transverse conveying device (18) which faces toward the container. Given the controlled intervention of the force transmission wheel (20), this device can be used to transfer the movement of the conveyor belt of the transverse conveying device (18) to the respective conveyor belt (8). It is thereby ensured that a sheet of glass (1) can be conveyed from the displacement carriage (16) into the container continuously and without shocks. A more detailed illustration in relation to this can be found in FIG. 5.

The sensors (24) serve to detect the state of the container compartment into which a sheet of glass (1) is conveyed or from which it is taken. Said sensors (24) are located on the longitudinal side of the supporting fork (12) which lies closest to the container. Said supporting fork (12) also bears sensors, in the manner of the sensors (25), for detecting defective sheets of glass (1) located in a container compartment. For this purpose, it is possible to use sensors which operate on the basis of light effects, or else it is possible to use ultrasonic sensors. When selecting the sensors (24) and (25), the selection for the respective intended application is left to a person skilled in the art. The removal of defective sheets of glass (1) from a container compartment is described in FIG. 4.

Figure 3:
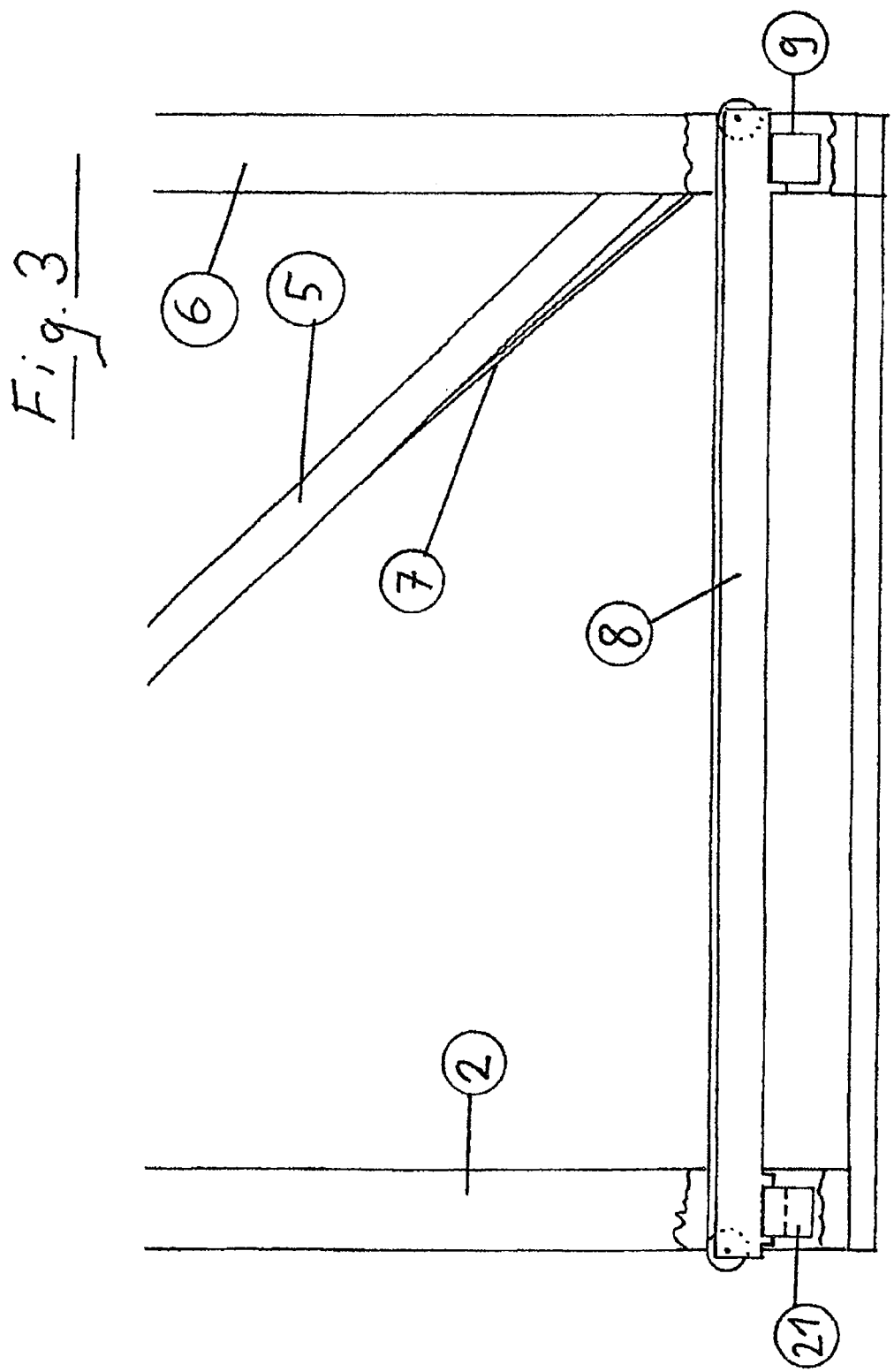
FIG. 3: shows a cross section from the base region of the container.

FIG. 3 shows a cross section from the base region of the container. In this figure, too, the rear portal (2), the front portal (6), the stabilizer (5) and a separating spoke (7) can be seen in cross section. In cross section, the support member (9) is shown in the region of the front portal (6) and the support member (21) is shown in the region of the rear portal (2). The conveyor belts (8) rest on these two support members next to one another in parallel. It can also be seen in FIG. 3 that each conveyor belt (8), taken by itself, represents a unit which, locked releasably by cams, can be removed from the container without obstructing the other conveyor belts (8).

The space between two adjacent conveyor belts (8) is occupied by a respective separating spoke (7).

Figure 4:
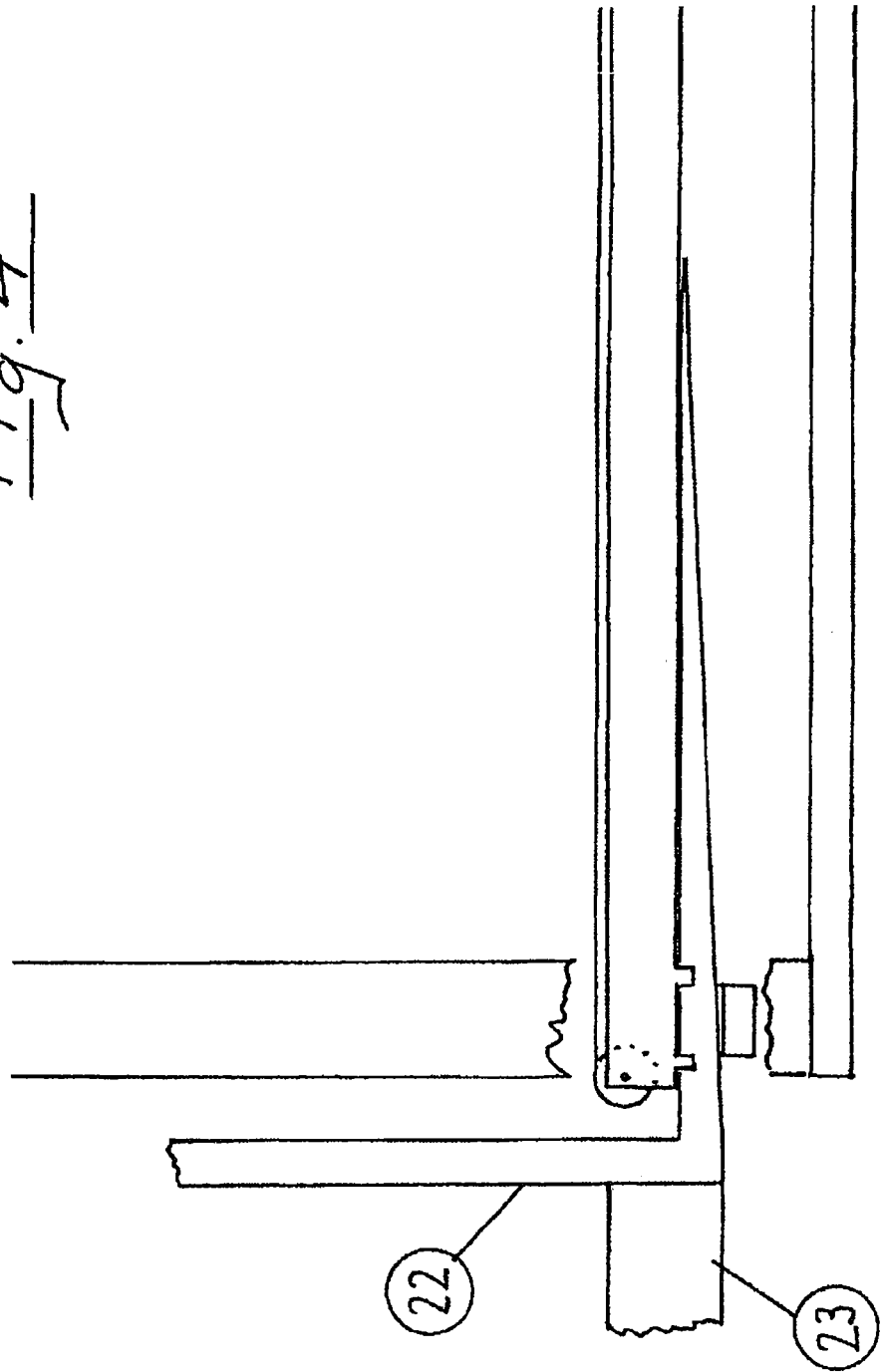
FIG. 4: is an illustration showing the function of the removal device.

FIG. 4 is an illustration showing the function of the removal device.

As has already been explained in the description of FIG. 3, each conveyor belt (8), taken by itself, can be removed from the container. This is necessary in the case in which sensors (25) determine that there is a defective sheet of glass (1) in a specific container compartment. FIG. 4 shows how any desired conveyor belt (8), together with a sheet of glass (1) located thereon, can be removed from the container by means of a removal device (23), which bears a gripping device in the form of a rectangular prong (22). In order to ensure that a removed sheet of glass (1) cannot tilt to the side, braces are fitted to the upper part of the prong (22), to the left and right in terms of the width of a container compartment, although these braces have not been depicted in FIG. 4 for reasons of a clear illustration. The removal device (23) can be operated by means of a multi-axis robot.

Figure 5:
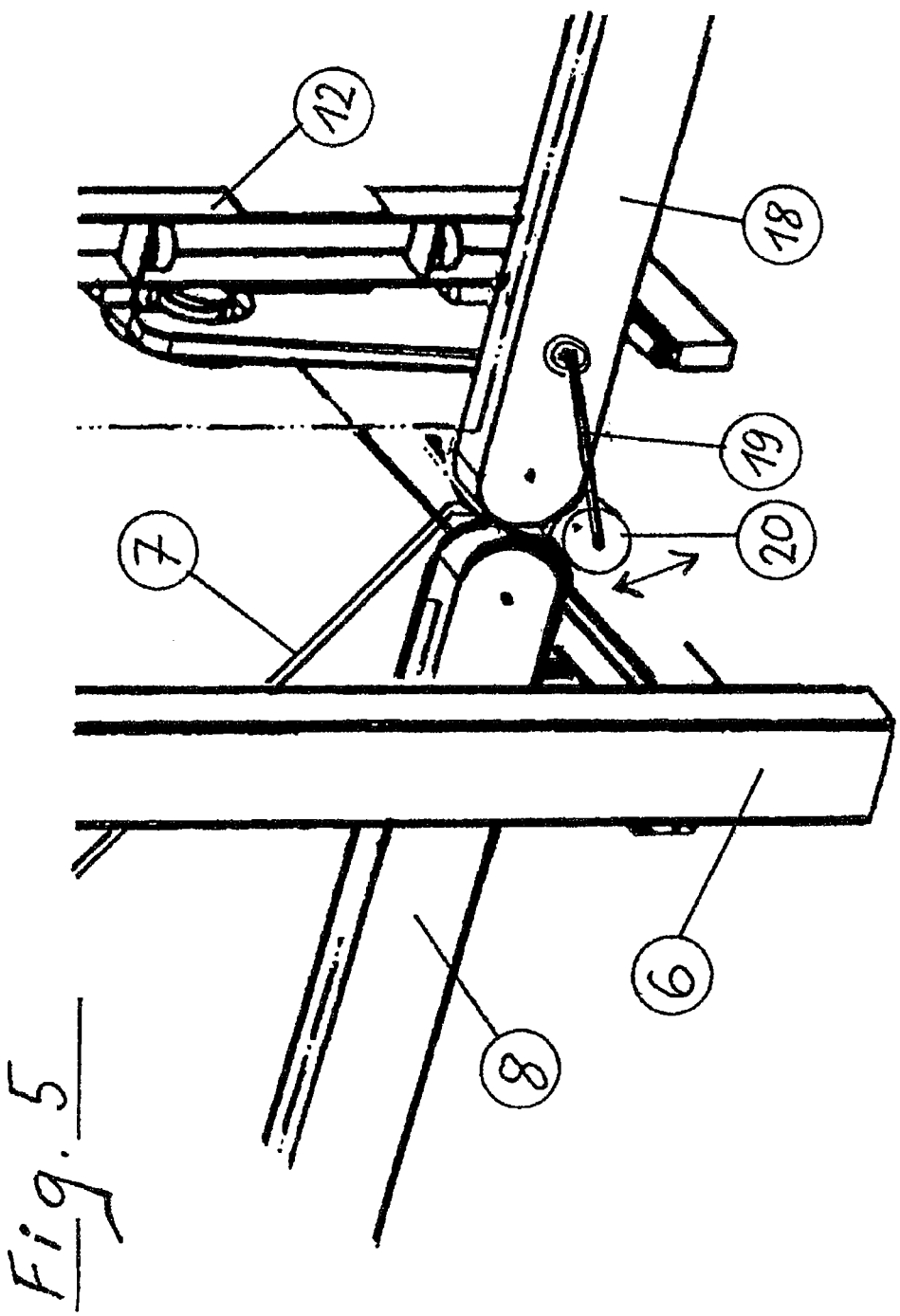
FIG. 5: is a perspective illustration of the drive of the conveyor belts.

FIG. 5 is a perspective illustration of the drive of the conveyor belts (8). This figure shows part of the front portal (6), a separating spoke (7), the supporting fork (12) arranged nearest to the container and a conveyor belt (8). A sheet of glass (1) standing on the transverse conveyor belt (18) is shown with a dashed outline. The top side of the endless conveyor belt, which bears the respective sheet of glass (1) and moves the latter, of the transverse conveying device (18) bears substantially transversely extending lugs, and said conveyor belt is driven by the drive (17). If the force transmission wheel (20) is pushed into the engaged position by the rocker lever (19), it transmits the force applied by the transporting belt of the transverse conveying device (18) onto the conveyor belt (8). This is, of course, only possible when both belts have the same lug structure and the force transmission wheel (20) likewise has lugs matched to this structure on its surface. In the example shown in FIG. 5, the conveyor belt of the transverse conveying device (18) moves from right to left, in order to convey a sheet of glass (1) into the container. The force transmission wheel (20) consequently rotates clockwise and drives the conveyor belt (8) in the same direction in which the transporting belt of the transverse conveying device (18) is running, specifically into the interior of the container. An end switch registers the arrival of the glass plate (1) at the end position. The rocker lever (19) of the force transmission wheel (20) has two positions, and these are controlled by the control program for the entire system to which the container belongs.

Figure 6:
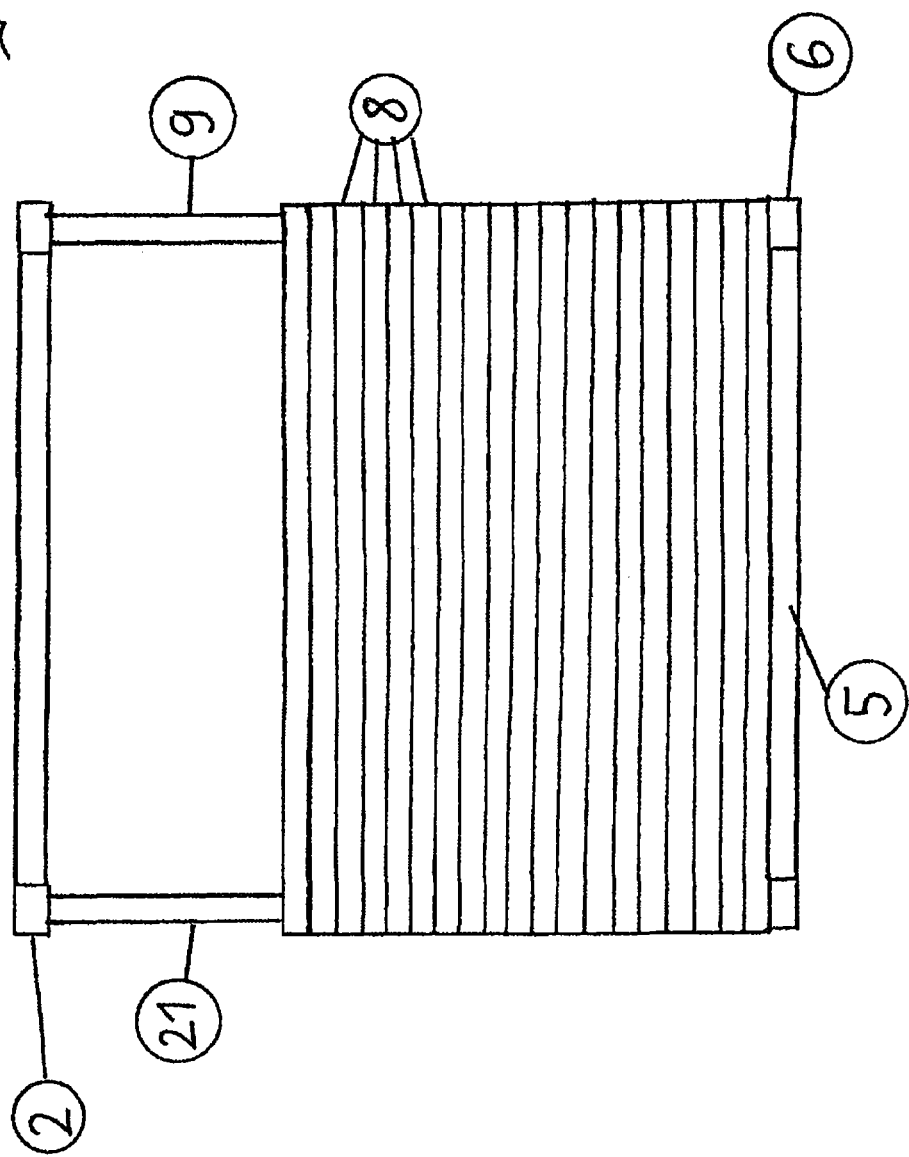
FIG. 6: shows a plan view of the conveyor belts.

FIG. 6 shows a plan view of the position of the conveyor belts (8). In this figure, the rear portal (2), the front portal (6) and a stabilizer (5) can be seen from above. This figure clearly shows the position of the front support member (9) and the rear support member (21) in relation to the structure of the container.

Figure 7:
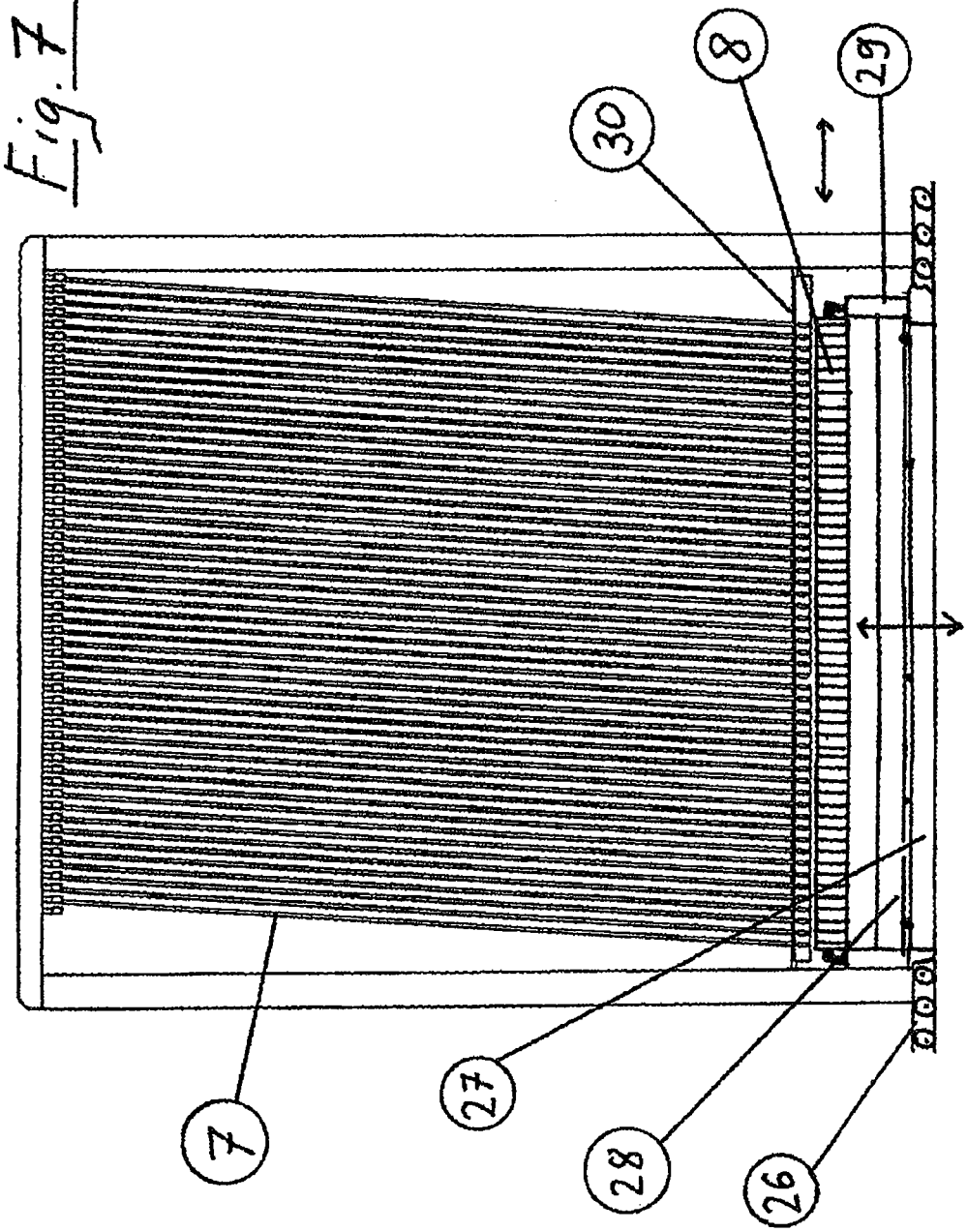
FIG. 7: shows a first variant of the positioning of the sheets of glass in the storage unit.

FIG. 7 shows a first variant of the positioning of the sheets of glass in the storage unit on support members (30). These may be axles, axle pieces or rollers. In this figure, too, the oblique separating spokes (7) and the corresponding conveyor belts (8) are shown, from the front. The storage unit as a whole can be moved on the track (26). An additional track (27) for a conveyor belt mount (28) is provided underneath the storage unit, as can be seen from the side view of FIG. 8. The support members (30), shown in section, for the sheets of glass can be seen more clearly from FIG. 8. The vertically extending double-headed arrow indicates the vertical adjustment or the possibility of lifting or lowering a conveyor belt housing (31) by means of the lifting device (29). In the case of this device, the conveyor belt mount (28) is moved respectively under the respective conveyor belt (8), and the conveyor belt housing (31) is lifted in order to convey the sheet of glass in question into the storage unit or out of the storage unit. Since, in the case of a lifting or lowering action of the conveyor belt housing (31) by means of the lifting devices (29), the position of these support members (30) would clearly prevent this, the conveyor belt (8) is respectively led around the support member (30) in question. This can clearly be seen from the illustration in FIG. 8. The respective conveyor belt (8) is driven, in turn, by the transverse conveying device (18) via a force transmission wheel (20), as described in the explanation of FIG. 5.

Figure 8:
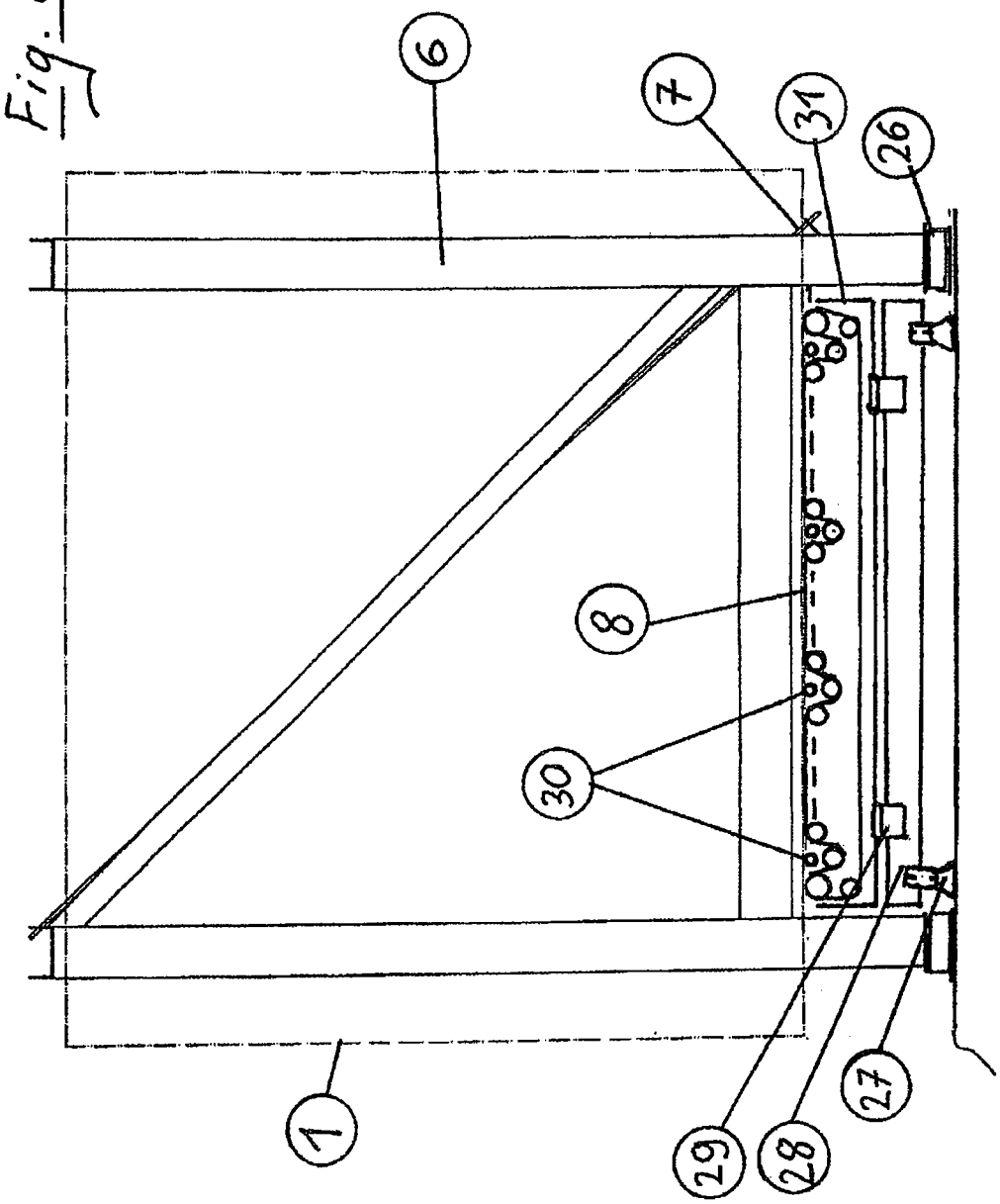
FIG. 8: shows a side view of a second variant of the drive of the conveyor belts.

FIG. 8 shows a side view of a second variant of the drive of the conveyor belts (8). In this case, the front portal (6) is located on the right-hand side, which can also be seen from the position of the separating spokes (7). It can be seen from this view that a sheet of glass (1) rests on the support members (30) in the idle state. Since, in the case of a lifting or lowering action of the conveyor belt housing (31) by means of the lifting devices (29), the position of these support members (30) would clearly prevent this, the conveyor belt (8) is respectively led around the support member (30) in question. This is shown in quadruplicate in the side view of FIG. 8. The two lifting devices (29) at the front and rear of the conveyor belt housing (31), or on the right and left in FIG. 8, move together with the conveyor belt mount (28) on the track (27). In this figure, too, reference symbol (26) denotes the possibility for the entire storage unit to move.

Figure 9:
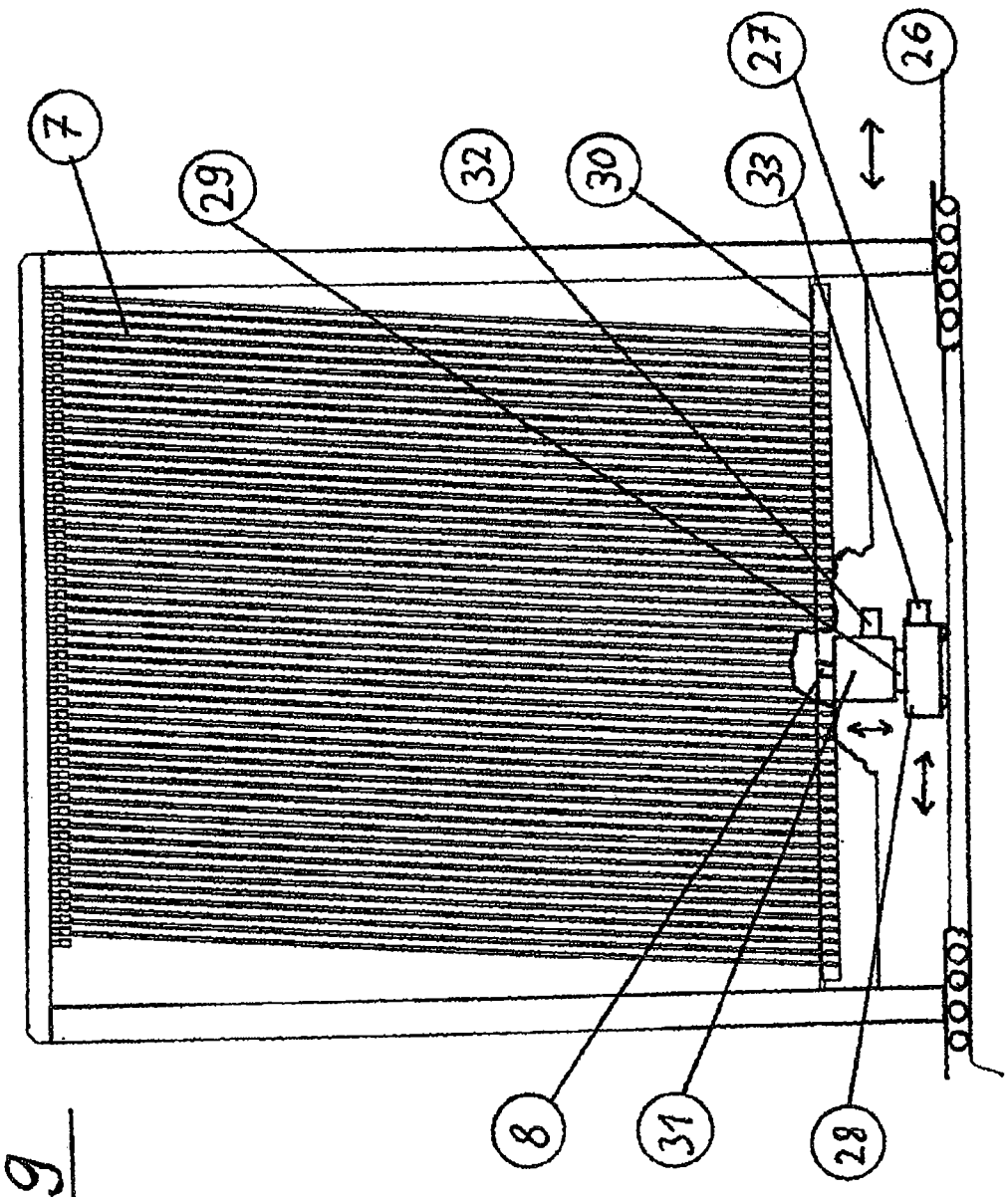
FIG. 9: shows a front view of the second variant of the drive of the conveyor belts.

FIG. 9 shows a front view of the second variant of the drive of the conveyor belts.

In this figure, too, the storage unit is again shown from the front, with the separating spokes (7) and the conveyor belts (8), a support member (30) for sheets of glass and also a conveyor belt (8) drawn in a special manner. For this purpose, a "cutout" is introduced in the structure of the separating spokes (7) at the relevant location.

The conveyor belt mount (28), which bears a conveyor belt housing (31), moves on the track (27). A lifting device (29) is arranged between the conveyor belt mount (28) and the conveyor belt housing (31). There is a separate drive (32) for the conveyor belt in the conveyor belt housing (31). In this case, the conveyor belts (8) are therefore not driven by means of the force transmission wheel (20) of the transverse conveying device (18), but independently. The conveyor belt mount (32) is moved by means of a separate drive (33), which can move the mount over the entire region of the conveyor belts (8) in accordance with the horizontal double-headed arrow. The storage unit itself is also movable over the track (26), as shown.

The interactive control of the displacement carriage (16), of the feeding roller conveyor, of the vertical adjuster and of the elements for the transverse conveyance of the sheets of glass (1), in conjunction with the separate detection and error detection of the sheets of glass (1), the monitoring of the positioning of the sheets of glass (1) using lasers and/or sensors in the course of the production of photovoltaic elements or TFT screens, requires a special control program. The system parts which relate to the various variants of the positioning or of the drive of the conveyor belts require a further control program, which can be integrated in the main control program. It is self-evident to a person skilled in the art that the device according to the invention and the method according to the invention, although conceived specifically for clean-room requirements, can also be used substantially naturally in normal systems.

Although the device according to the invention and the method according to the invention are preferably designed for loading a container with thin sheets of glass of a large surface area, it is clear to a person skilled in the art that such a container can also be loaded with relatively small and/or relatively thick sheets of glass.

It is also understood that the methods described herein may be implemented in a program with program code and executed on a computer, as well as, stored on a machine readable storage medium.

As a person skilled in the art will readily appreciate, the above description is meant as an illustration of implementation of the principles this application. This description is not intended to limit the scope or application of this invention in that the invention is susceptible to modification, variation and change, without departing from the spirit of this invention, as defined in the following claims.

LIST OF REFERENCE SYMBOLS (1) Sheet of glass
(2) Rear portal (rear portal)
(3) Upper longitudinal strut (base frame)
(4) Transport brackets
(5) Stabilizer
(6) Front portal (base frame)
(7) Separating spokes
(8) Conveyor belt
(9) Support member for conveyor belts
(10) Lower longitudinal strut (base frame)
(11) Fixing means for a glass plate
(12) Supporting fork
(13) Rollers (roller conveyor)
(14) Slide rails of the vertical adjuster
(15) Drive of the vertical adjuster
(16) Displacement carriage
(17) Drive of the displacement carriage
(18) Transverse conveying device for loading and unloading
(19) Rocker lever of the force transmission wheel
(20) Force transmission wheel
(21) Support member of the conveyor belt
(22) Prong of the removal device
(23) Removal device
(24) Sensor for loading and unloading
(25) Sensor for acceptance
(26) Track of the storage unit
(27) Track for a conveyor belt mount
(28) Conveyor belt mount
(29) Lifting device for a conveyor belt
(30) Support member for sheets of glass
(31) Conveyor belt housing
(32) Conveyor belt drive
(33) Drive of the conveyor belt mount

The invention claimed is:

1. A device for loading a container with products, the device comprising:
   a) a placement device configured to bring into place individual sheets of glass,
   b) a vertical adjuster with a displacement carriage and supporting forks,
   c) a transverse conveying device, and
   d) an assembly configured to transmit force from the transverse conveying device to a respective conveyor belt of the container.

2. The device as claimed in claim 1, wherein the supporting forks of the vertical adjuster comprise:
   a fixing mechanism configured to hold the individual sheets of glass,
   sensors configured to detect glass breakage, and
   sensors configured to identify an occupancy state of a container compartment.

3. The device as claimed in claim 1, wherein the conveyor belt of the container is driven by the force transmitted by the assembly from the transverse conveying device of the vertical adjuster, the assembly comprising a transmission wheel and a rocker lever.

4. The device as claimed in claim 1, wherein the container comprises a plurality of conveyer belts, and each conveyor belt of the plurality of conveyer belts is removable from the container by a removal device.

5. The device as claimed in claim 1, wherein a sheet of glass among the individual sheets of glass is supported on support members and is extended or retracted in the container by the conveyor belt of the container driven by the force transmitted by the assembly, and wherein a side of the conveyor belt facing the sheet of glass has, at the locations of the support members, a belt guide, which leaves the support members clear.

6. The device as claimed in claim 1, wherein a sheet of glass among the individual sheets of glass is supported on support members and is extended or retracted in the container by the conveyor belt of the container, driven by a separate drive of an automatically movable conveying mount in conjunction with a lifting device, wherein a side of the conveyor belt facing the sheet of glass has, at the locations of the support members, a belt guide, which leaves the support members clear.

7. The device as claimed in claim 1, wherein a movable element of the device includes abrasion-resistant material, and a drive of the device is protected from emission from abrasion of the movable element.

8. The device as claimed in claim 1, further comprising sensors configured to measure parameters used to control the loading of the container.

9. A method for loading a glass product into a container, the method comprising:
   receiving a glass product in a horizontal orientation by supporting forks of a vertical adjuster, wherein the supporting forks are movable horizontally on a displacement carriage of the vertical adjuster,
   pivoting the glass product into a substantially vertical position by the vertical adjuster,
   displacing the glass product by a conveying device of the vertical adjuster on a transporting belt towards a loading compartment, by moving the supporting forks of the vertical adjuster, and
   transferring the glass product from the vertical adjuster to the loading compartment by engaging a conveyer belt of the loading compartment with the transporting belt of the vertical adjuster.

10. The method as claimed in claim 9, wherein the vertical adjuster comprises:
    a fixing mechanism on the supporting forks configured to support the glass product,
    sensors configured to detect breakage of the glass product, and
    sensors configured to detect occupancy state of the loading compartment.

11. The method as claimed in claim 9, further comprising, driving the conveyor belt of the container by the engaging of the conveyer belt of the container with the transporting belt of the vertical adjuster using a force transmission wheel and a rocker lever of the conveying device of the vertical adjuster.

12. The method as claimed in claim 9, wherein the container comprises a plurality of conveyer belts, wherein each conveyor belt is removable from the container by a removal device.

13. The method as claimed in claim 9, further comprising:
    supporting the glass product on support members, and
    extending or retracting the glass product in the container by the conveyor belt driven by a force transmitted by the engaging of the conveyer belt with the transporting belt of the vertical adjuster, wherein a side of the conveyor belt facing the glass product has, at the locations of the support members, a belt guide, which leaves the support members clear.

14. The method as claimed in claim 9, further comprising:

supporting the glass product on support members, and extending or retracting the glass product in the container by the conveyor belt driven by a separate drive of an automatically movable conveying mount in conjunction with a lifting device, wherein a side of the conveyor belt facing the glass product has, at the locations of the support members, a belt guide, which leaves the support members clear.

15. The method as claimed in claim 9, wherein a movable element used for the method includes abrasion-resistant material, and a drive protected from emission caused by abrasion of the movable element.

16. The method as claimed in claim 9, further comprising monitoring parameters of the loading of the container by sensors.

17. A non-transitory machine-readable storage medium with instructions executable by one or more processors, the non-transitory machine-readable storage medium comprising:

instructions to pivot a glass product from a horizontal position to a substantially vertical orientation using supporting forks of a vertical adjuster;

instructions to place the pivoted glass product on an endless transporting belt of a conveying device of the vertical adjuster;

instructions to move the glass product towards a compartment of a container by moving the conveying device of the vertical adjuster;

instructions to transmit force from the conveying device of the vertical adjuster to a conveyer belt of the container by engaging the conveying device of the vertical adjuster with the conveyer belt of the container; and instructions to transfer the glass product from the vertical adjuster to the compartment of the container by displacing the glass product from the conveying device of the vertical adjuster to the engaged conveyer belt of the container.

18. The non-transitory machine-readable storage medium of claim 17, wherein the conveying device of the vertical adjuster is engaged with the conveyer belt of the container by an assembly comprising a wheel and a rocker arm.

19. The non-transitory machine-readable storage medium of claim 17 further comprising instructions to initiate a sensor of the vertical adjuster to detect a breakage in the glass product using measurement of refraction of light.

20. The non-transitory machine-readable storage medium of claim 17, wherein the container comprises a plurality of compartments and a plurality of conveyer belts, each conveyer belt corresponding to a respective compartment.

\* \* \* \* \*